United States Patent
Padiyar et al.

(10) Patent No.: US 12,112,301 B2
(45) Date of Patent: Oct. 8, 2024

(54) CHECK EXCEPTION PROCESSING IN THE META VERSE

(71) Applicant: Bank of America Corporation, Charlotte, NC (US)

(72) Inventors: Sneha Padiyar, Mumbai (IN); Sandeep Kumar Chauhan, Hyderabad (IN); Nandini Rathaur, Mumbai (IN); Aditya Sharma, New Delhi (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/878,183

(22) Filed: Aug. 1, 2022

(65) Prior Publication Data

US 2024/0037514 A1    Feb. 1, 2024

(51) Int. Cl.
G06Q 20/04    (2012.01)
G06Q 20/38    (2012.01)

(52) U.S. Cl.
CPC ....... G06Q 20/042 (2013.01); G06Q 20/3825 (2013.01); G06Q 20/384 (2020.05)

(58) Field of Classification Search
CPC ............................. H04L 63/08; G06Q 20/4014
See application file for complete search history.

(56) References Cited

U.S. PATENT DOCUMENTS

| | | | |
|---|---|---|---|
| 2010/0082798 A1 | 4/2010 | Bhogal et al. | |
| 2010/0153858 A1* | 6/2010 | Gausman | H04L 65/1069 715/757 |
| 2014/0067661 A1* | 3/2014 | Elischer | G06Q 20/042 705/39 |
| 2015/0143487 A1* | 5/2015 | Nathan | H04L 63/08 726/6 |
| 2015/0200950 A1* | 7/2015 | Meunier | G06Q 20/40 726/4 |
| 2018/0034642 A1* | 2/2018 | Kaehler | H04L 9/3247 |
| 2021/0383377 A1* | 12/2021 | Zhou | H04L 9/3213 |
| 2023/0216682 A1 | 7/2023 | Lipton et al. | |
| 2023/0254300 A1* | 8/2023 | Silverstein | H04L 9/3268 726/10 |

OTHER PUBLICATIONS

Opportunities in the metaverse, JP Morgan, 2022 (Year: 2022).*
The metaverse_ A virtual reality check _ Computer Weekly, 2022 (Year: 2022).*

* cited by examiner

*Primary Examiner* — David P Sharvin
*Assistant Examiner* — Amanulla Abdullaev
(74) *Attorney, Agent, or Firm* — Weiss & Arons LLP (57) ABSTRACT

Systems, methods, and apparatus are provided for authenticating avatar activity in a metaverse environment. A metaverse application may enable interactions between an agent avatar and a customer avatar in a secure bidirectional metaverse session. Customer identity may be verified using meta-information associated with avatar appearance or behavior, device data, and/or methods of avatar control. The agent avatar and customer avatar may view a virtual representation of a defective check in the metaverse environment. The customer avatar may sign the virtual check in the metaverse environment. The signature may be captured and reproduced on a paper check by a device interfacing with the metaverse application. The metaverse application may store technical logs of the metaverse session for future reference.

3 Claims, 6 Drawing Sheets

CHECK EXCEPTION PROCESSING IN THE META VERSE

FIELD OF TECHNOLOGY

Aspects of the disclosure relate to correction of check processing defects through metaverse interactions.

BACKGROUND OF THE DISCLOSURE

Automated check processing may be impeded by a range of factors such as an improperly captured image, insufficient funds in the payor account, or a signature that does not match records. In some cases, processing may be impeded by defective MICR line data on the check or a defect in the reading of the MICR line data.

Such defects may render the check an "exception" to normal check processing: the check may be subject to "exception processing."

Exception processing typically involves human intervention. Correction of the defect may involve assessment of the scanned image by a human agent. Correction of the defect may involve intervention by a human agent to obtain information from a customer such as a new image or a new signature. Connecting with the customer in a secure manner may be a slow and inefficient process.

The metaverse is a virtual shared space that is accessed via the internet. In its broadest form, the metaverse may encompass the entire social and economic structure that exists in both the actual and virtual worlds. Avatars, content, and goods may all travel around freely.

In the metaverse, a virtual world experience may be created by simulating human emotions and gestures. Individuals in the metaverse may communicate and transact with each other and with digital 3D items.

It would be desirable to use a secure metaverse session to repair check processing exceptions. It would further be desirable to leverage aspects of the metaverse interaction itself to authenticate a user.

SUMMARY OF THE DISCLOSURE

Systems, methods, and apparatus for authenticating an avatar signature in a metaverse environment are provided.

A metaverse application may maintain a secure bidirectional metaverse session. The session may include a metaverse environment. A first avatar and a second avatar may interact in the metaverse environment. The first avatar may be controlled via input at a first user device and the second avatar controlled via input at a second user device.

The metaverse application may authenticate the first avatar in the metaverse environment. The first avatar may be authenticated based on a method of avatar control at the first user device. The metaverse application may render a virtual version of a financial instrument in the metaverse environment for viewing by the first avatar and the second avatar.

The metaverse application may render a signature by the first avatar on the virtual version of the financial instrument. The signature may be based on input at the first user device. The metaverse application may store a record of the metaverse session in a computer memory.

The metaverse application may interface with a check printing device. The check printing device may reproduce the signature on a paper version of the financial instrument. The check printing device may reproduce the signature in real time.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

Systems, methods, and apparatus are provided for authenticating an avatar signature in a metaverse environment.

For the sake of illustration, the invention will be described as being performed by a "system." The system may include one or more features of apparatus and methods that are described herein and/or any other suitable device or approach.

Check exception processing may require communication between an agent and a customer to correct defects such as an account number or a signature. The system may enable interactions between the parties in a secure metaverse session. The system may authenticate one or both parties based on features of the metaverse interaction.

A financial institution customer may register for metaverse interactions with the financial institution. In some embodiments, a customer may automatically be registered for metaverse interaction and may opt out if desired. Registration may be associated with opening an account at the financial institution or with initiating any suitable financial service.

Customer registration or opt-out may be received at a banking center, at a financial institution portal, at a mobile device application, via telephone, or via any suitable method. A customer may communicate with a mobile device application using an interactive response system, via a live agent interaction, or via any suitable method. Customer registration or opt-out data may be stored in a reference database associated with the financial institution.

In some embodiments, a customer device may be registered with the financial institution for metaverse interaction. Customer device data may be stored in the reference database. Customer device data may be stored in association with customer account data. Customer device registration may include download or installation of software for secure metaverse access.

A customer may write a check drawing on their financial institution account. Alternatively, the customer may deposit or cash a check. A paper check may be digitized as part of an automated check processing protocol. Check exceptions, such as insufficient funds in the payor account or a mismatched signature, may require interactions with the customer to repair the exception.

An agent may reach out to a customer to repair a check processing exception. For example, a check may require a replacement signature. The agent may transmit a link encoded for access to a metaverse session to the customer. The link may be transmitted to a customer mobile application on a customer device. Alternatively, the link may be transmitted by email, accessed on a web portal, or communicated by any suitable method. The link may be incorporated into a graphic.

A metaverse application may initiate and maintain the metaverse session. The metaverse application may be associated with a financial institution. Client devices on the agent side and the customer side may interface with the metaverse application.

The customer may use the link to access a bidirectional, secure metaverse session. The customer may log into the metaverse session using a digital avatar. The digital avatar may be registered to the customer.

The system may leverage aspects of the metaverse interaction for streamlined verification of user identify. For example, the system may verify the identity of the customer by authenticating the customer avatar.

Authentication of a customer avatar in the metaverse environment may be based on meta-information associated with the avatar. Authentication may be based on one or more features associated with the avatar appearance. The avatar may be preregistered with the financial institution and avatar details may be stored in association with a customer account. In some embodiments, avatar details may be recorded in the course of metaverse interactions with a customer and stored for future reference.

In some embodiments, authentication of a customer avatar may be based on metadata associated with a customer device used to control the avatar. The device may be preregistered with the financial institution and device information may be stored in association with a customer account. In some embodiments, a deice token may be used for authentication. In some embodiments, device details may be recorded in the course of metaverse interactions with a customer and stored for future reference.

In some embodiments, authentication of the avatar may be based on historical modes of controlling the avatar. For example, authentication may be based on a method of interaction with the device used to control the avatar. In some embodiments, these control methods may be recorded in the course of metaverse interactions with a customer and stored for future reference. A user may control the avatar using touch-based input, touch-free input, and/or a combination of touch-based and touch-free inputs.

In some embodiments, user inputs may be hands-on. Hands-on user input may be received via keystrokes on a keyboard, buttons on a surface of the device, movement of an input device such as a joystick, use of a stylus, or by any suitable method. User input may be received via a device touch screen. Touch-based gestures may include swiping, tapping, squeezing and any other suitable touch-based gestures or combination of touch-based gestures.

In some embodiments, user inputs may be hands-free. Hands-free input may include voice commands, gesture recognition, eye tracking or any other suitable method. Gesture recognition may include air-based hand and/or body gestures. Air-based gestures may be performed without touching the device.

A user device may include one or more sensors. Illustrative sensors may include a touch screen, camera, accelerometer, gyroscope, and any other suitable sensors. Sensors may detect hands-free input such as air gestures or eye movement.

A touch-sensitive screen may capture finger motions. The device may include specialized software executable by the device microprocessor for automatic conversion of finger motions as they are input by the user on the touch-sensitive screen.

The touch-sensitive screen may utilize resistive touch technology to detect user touch points. Screens constructed using resistive touch technology include an upper layer (which is touched by the user) spaced apart from a bottom layer. When the user touches the screen, the upper layer contacts the bottom layer, generating an electrical signal. Screens constructed using resistive touch technology only require the application of pressure and do not require application of heat or electrical charge to detect a touch point. Resistive-touch technology is also relatively less expensive than other touch sensing technologies.

The touch-sensitive screen may utilize capacitive touch technology to detect user touch points. Screens constructed using capacitive touch technology may identify where a user touches based on detecting an electrical disturbance created when the user touches the screen. The human body is an electronical conductor and, contact with another conducting surface such as the surface of a touch-sensitive screen, typically generates a detectable electrical disturbance. Capacitive touch technology detects the electrical disturbance and determines where on the screen the user touched.

The touch-sensitive screen may utilize any suitable touch detection technology such as surface acoustic wave, optical imaging, infrared acrylic projection or acoustic pulse recognition technologies.

A user device may include a touch-sensing controller for detecting a touched location. The touch-sensing controller may include an application-specific integrated circuit (ASIC) chip and a digital signal processor (DSP) chip.

In some embodiments, the touch-sensitive screen may provide "single-touch" functionality. In some embodiments, the touch-sensitive screen may provide "multi-touch" functionality. Single-touch functionality may detect input from one user touch on the touch-sensitive screen. Single-touch functionality may also recognize double finger taps or a long-press functionality. Multi-touch functionality may detect input from two or more simultaneous user touch points on the touch-sensitive screen. For example, a pinch-to-zoom feature is a multi-touch functionality.

The user device may include a haptic response system. The haptic response system may provide a responsive force, vibration or movement in response to receiving a user's touch input. For example, the haptic response system may provide a responsive vibration to a user's touch-based selection of a payment option. The haptic response system may include an eccentric (unbalanced) rotating mass, a linear resonant actuator, a piezoelectric actuator or any other suitable hardware for providing a haptic response.

The user device may include smart glasses or a virtual reality headset. The smart glasses or virtual reality headset may be used alone or in combination with another device.

The customer avatar may interact with an agent avatar in the metaverse environment. The metaverse environment may simulate a banking center environment or any suitable environment.

The system may display a virtual representation of the defective check in the metaverse environment. The agent avatar and the customer avatar may view the check in the metaverse environment.

The agent avatar may explain check exception processing to the customer avatar. The agent avatar may inform the customer avatar of a signature defect. The customer avatar may provide a virtual signature to replace the defective signature. The system may render the virtual signature of the customer avatar on the virtual check.

The system may capture the replacement signature. In some embodiments, the signature may be inserted into a digital scan of the paper check.

In some embodiments, the system may transmit the captured signature to a check printing device. The printing device may interface directly with a metaverse application. The printing device may reproduce the signature on a copy of the paper check. The printing device may print a copy of a digital check. The printing device may reproduce the replacement signature in real time.

The system may store a record of the metaverse interaction. The record may include interactions between the agent avatar and the customer avatar. The record may include check exception remediation activity such as a replacement signature or check amount.

The record may include technical logs associated with the customer device. The technical logs may include methods of interaction with the customer device and methods for controlling the avatar at the customer device. The stored methods of interaction may be used to authenticate a customer device or a customer avatar. For example, if a user regularly controls an avatar using a virtual reality headset, but later attempts to log in at a laptop using keyboard controls, the system may require additional information to verify identity.

The metaverse application may include a user experience module. The user experience module may manage the environment and determine how the environment appears to the customer and the agent. The user experience module may manage how the interaction between the avatars appears to the customer and the agent.

The metaverse application may include a view engine/controller module. The view engine/controller module may enable the agent to limit customer access to information. Screens or items that are not related to the customer may be visible to the agent but hidden from the customer.

The metaverse application may include a session manager module. The session manager module may retain a memory of the interaction between the two digital avatars for the duration of the session. The session manager may generate audit logs to store a record of the interaction for future access.

The metaverse application may include one or more hardware interfaces. Hardware interfaces may mediate between the shared environment and customer or agent devices. Each hardware interface may include a signal interceptor. Each hardware interface may include a signal processor. Each hardware interface may include a signal convertor and action mapper to translate the signals into avatar actions in the metaverse environment.

An added layer on the customer and agent devices may accept user inputs. Illustrative inputs may be touch-based, gesture-based, or stylus-based. The added layer may be haptic enabled.

One or more non-transitory computer-readable media storing computer-executable instructions are provided. When executed by a processor on a computer system, the instructions perform a method for authenticating an avatar signature in a metaverse environment.

The method may include, using a metaverse application, maintaining a secure metaverse session that includes a metaverse environment. The method may include authenticating an avatar in the metaverse environment. The avatar may be controlled by input at a user device. The user device may interface with the metaverse application. The authentication may be based, at least in part, on metadata associated with the avatar.

The method may include rendering a digital version of a financial instrument in the metaverse environment for viewing by the avatar. The method may include rendering a replacement signature from the avatar on the virtual version of the financial instrument. The signature of the avatar may be based on input at the user device.

The method may include capturing the replacement signature and transmitting the replacement signature to a check printing device. The check printing device may interface with the metaverse application. The check printing device may reproduce the replacement signature on a paper version of the financial instrument. The check printing device may reproduce the replacement signature in real time.

Systems, methods, and apparatus in accordance with this disclosure will now be described in connection with the figures, which form a part hereof. The figures show illustrative features of apparatus and method steps in accordance with the principles of this disclosure. It is to be understood that other embodiments may be utilized, and that structural, functional, and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with another illustrative apparatus/method embodiment.

Figure 1:
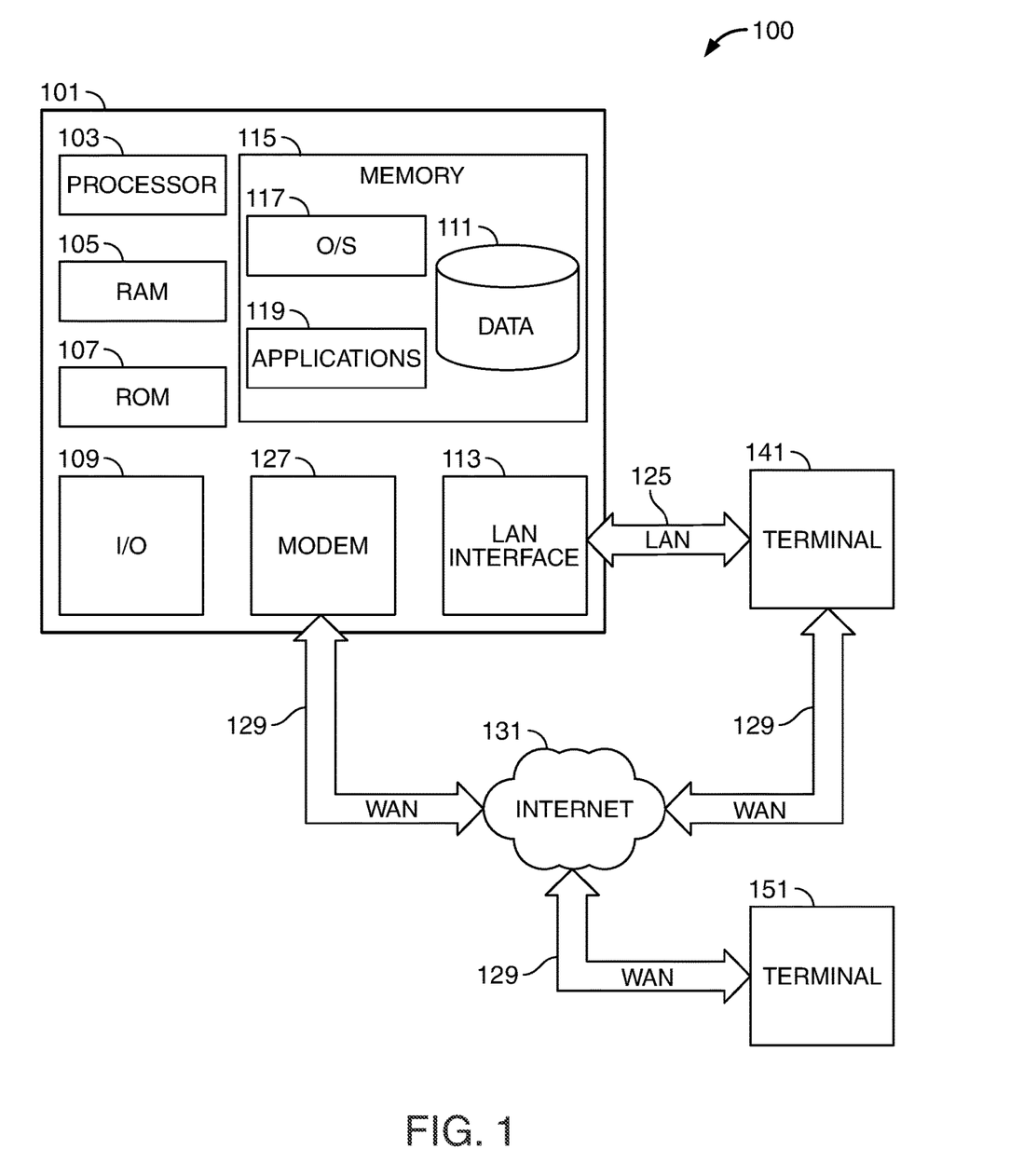
FIG. 1 shows illustrative apparatus in accordance with principles of the disclosure.

FIG. 1 shows illustrative apparatus 100 that may be configured in accordance with the principles of the invention. FIG. 1 is a block diagram that illustrates a computing device 101 (alternatively referred to herein as a "server or computer") that may be used in accordance with the principles of the invention. The computer server 101 may have a processor 103 for controlling overall operation of the server and its associated components, including RAM 105, ROM 107, input/output ("I/O") module 109, and memory 115.

I/O module 109 may include a microphone, keypad, touch-sensitive screen and/or stylus through which a user of device 101 may provide input, and may also include one or more of a speaker for providing audio output and a video display device for providing textual, audiovisual and/or graphical output. Software may be stored within memory 115 and/or other storage (not shown) to provide instructions to processor 103 for enabling server 101 to perform various functions. For example, memory 115 may store software used by server 101, such as an operating system 117, application programs 119, and an associated database.

Alternatively, some or all of computer executable instructions of server 101 may be embodied in hardware or firmware (not shown).

Server 101 may operate in a networked environment supporting connections to one or more remote computers, such as terminals 141 and 151. Terminals 141 and 151 may be personal computers or servers that include many or all of the elements described above relative to server 101. The network connections depicted in FIG. 1 include a local area network (LAN) 125 and a wide area network (WAN) 129, but may also include other networks.

When used in a LAN networking environment, computer 101 is connected to LAN 125 through a network interface or adapter 113.

When used in a WAN networking environment, server 101 may include a modem 127 or other means for establishing communications over WAN 129, such as Internet 131.

It will be appreciated that the network connections shown are illustrative and other means of establishing a communications link between the computers may be used. The existence of any of various well-known protocols such as TCP/IP, Ethernet, FTP, HTTP and the like is presumed, and the system may be operated in a client-server configuration to permit a user to retrieve web pages from a web-based server. Any of various conventional web browsers may be used to display and manipulate data on web pages.

Additionally, application program 119, which may be used by server 101, may include computer executable instructions for invoking user functionality related to communication, such as email, short message service (SMS), authentication services and voice input and speech recognition applications.

Computing device 101 and/or terminals 141 or 151 may also be mobile terminals including various other components, such as a battery, speaker, and antennas (not shown). Terminal 151 and/or terminal 141 may be portable devices such as a laptop, tablet, smartphone or any other suitable device for receiving, storing, transmitting and/or displaying relevant information.

Any information described above in connection with database 111, and any other suitable information, may be stored in memory 115. One or more of applications 119 may include one or more algorithms that encrypt information, process received executable instructions, interact with enterprise systems, perform power management routines or other suitable tasks. Algorithms may be used to perform the functions of one or more of maintaining a metaverse session, interfacing with user devices, managing metaverse interactions, authenticating an avatar, and/or perform any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
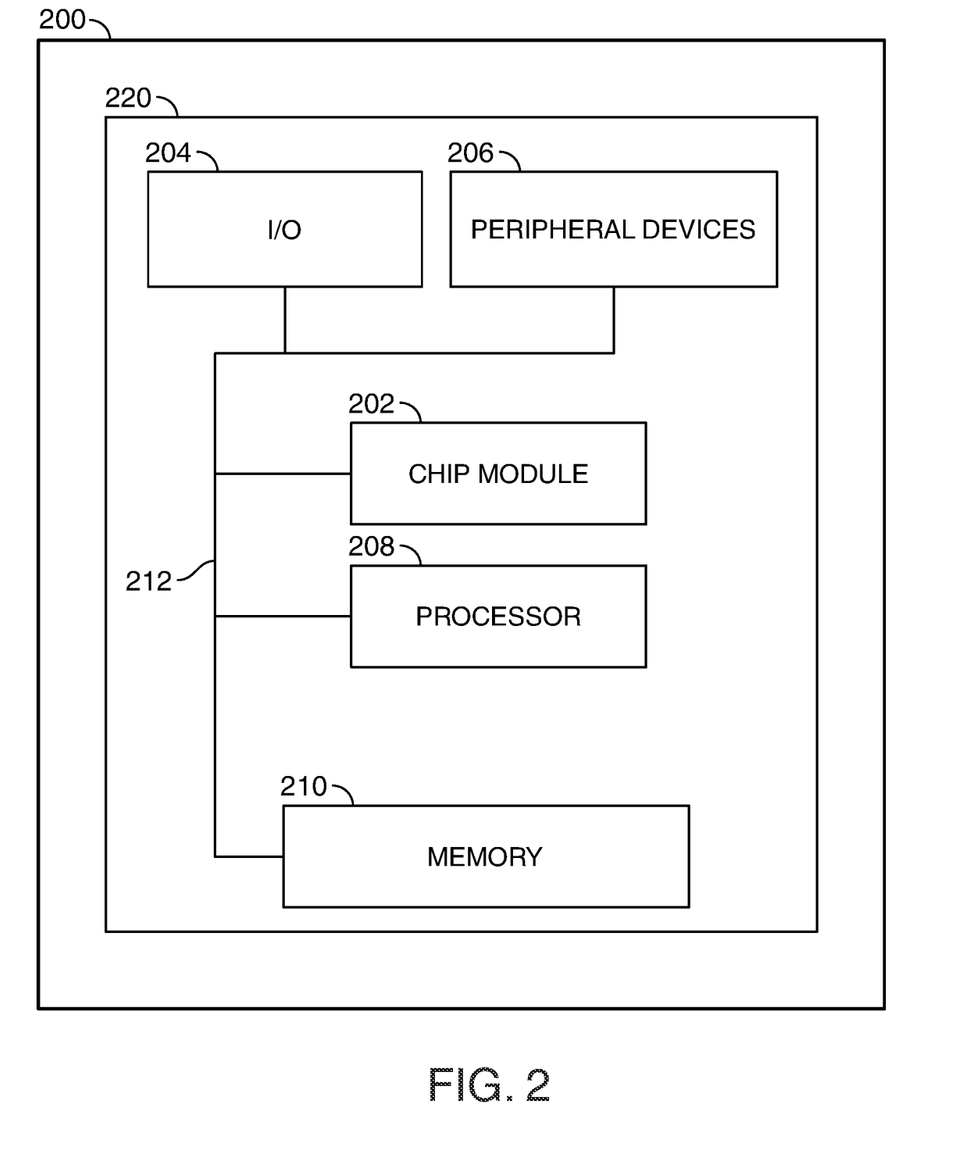
FIG. 2 shows illustrative apparatus in accordance with principles of the disclosure.

FIG. 2 shows an illustrative apparatus 200 that may be configured in accordance with the principles of the invention.

Apparatus 200 may be a computing machine. Apparatus 200 may include one or more features of the apparatus that is shown in FIG. 1.

Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable encoded media or devices; peripheral devices 206, which may include counter timers, real-time timers, power-on reset generators or any other suitable peripheral devices; logical processing device 208, which may maintain a metaverse session, interface with user devices, manage metaverse interactions, verify user identity and perform other methods described herein; and machine-readable memory 210.

Machine-readable memory 210 may be configured to store in machine-readable data structures: customer account data, metaverse registration or opt-out, metaverse session audit logs, avatar authentication data, check exception protocols, and any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
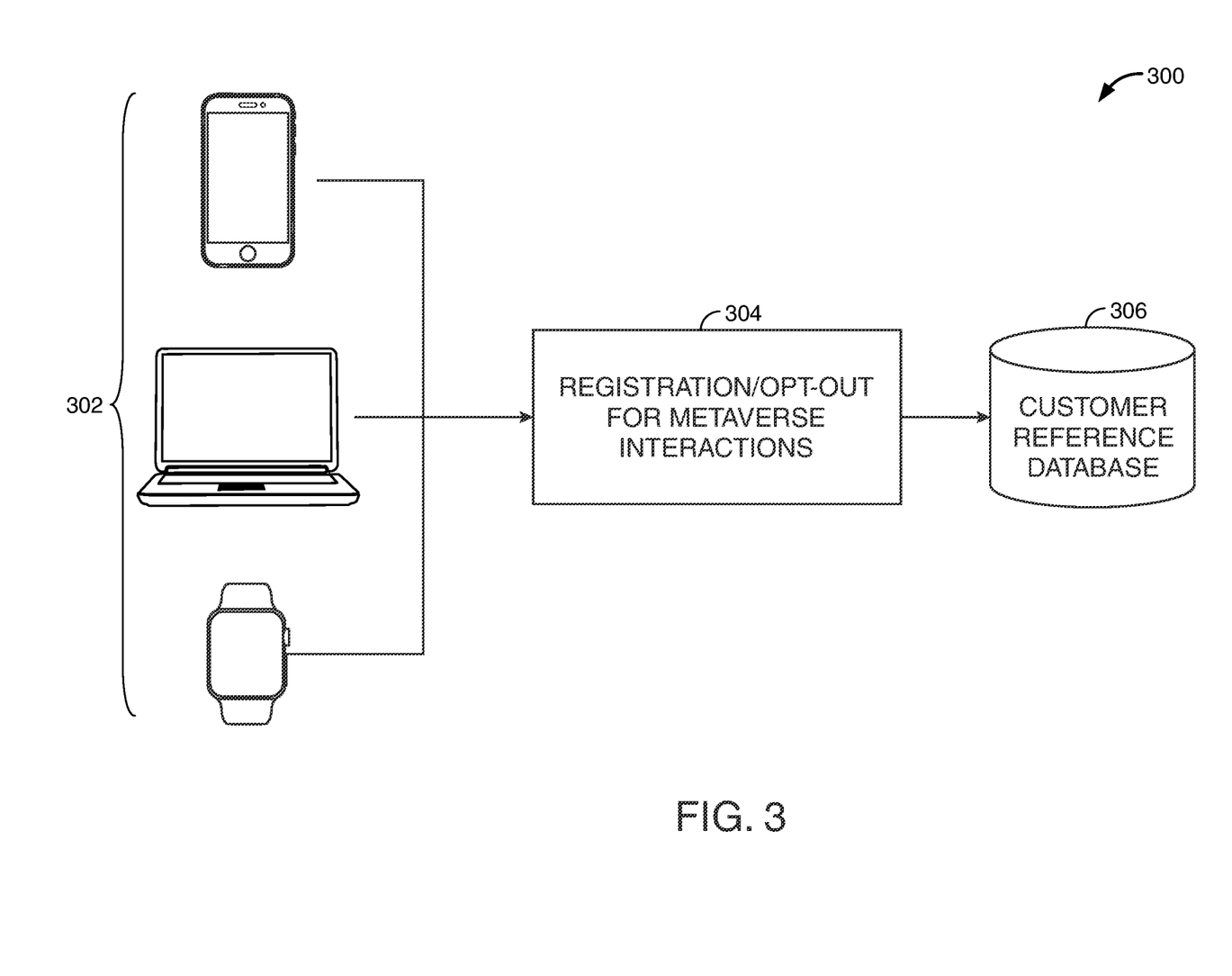
FIG. 3 shows an illustrative process flow in accordance with principles of the disclosure.

FIG. 3 shows process flow 300 for registering for or opting out of metaverse interactions. In some embodiments, registration or opt-out for metaverse interaction with a financial institution may be associated with initiating a financial product or service.

At step 302, registration or opt-out may be initiated at a user device. Illustrative devices are shown, however any suitable device may be used. Registration or opt-out may be initiated via a mobile application, internet portal, telephone interaction, in-person interaction, or via any suitable method. At step 304, the registration or opt-out may be received and processed. At step 306, registration or opt-out information may be stored in a customer reference database.

Figure 4:
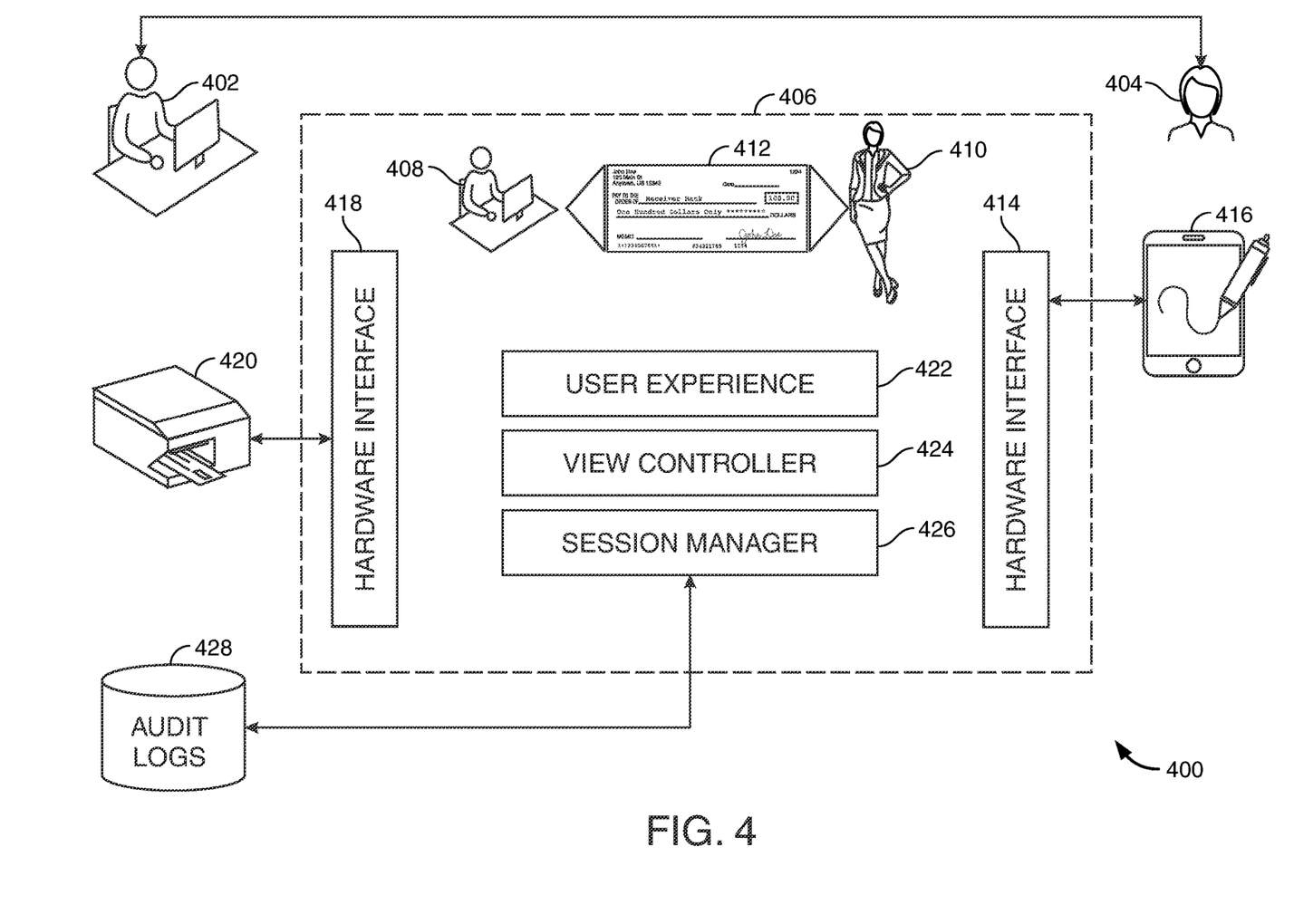
FIG. 4 shows an illustrative process flow in accordance with principles of the disclosure.

FIG. 4 shows illustrative process flow 400 for metaverse session interactions. Agent 402 may transmit a link to customer 404. The link may enable customer 404 to interface with metaverse application 406.

Metaverse application 406 may maintain a metaverse environment. The metaverse environment may simulate a real-world banking environment. In the metaverse environment, agent avatar 408 may interact with customer avatar 410.

Customer 404 may be authenticated prior to accessing the metaverse environment. In some embodiments, customer 404 may be authenticated within the metaverse environment. In some embodiments, customer identity may be verified based on meta-information associated with customer avatar 410.

In the metaverse environment, agent avatar 408 and customer avatar 410 may view virtual check 412. Virtual check 412 may be a representation of a physical check having a check exception. In an illustrative scenario, agent avatar 408 may explain a check exception due to signature mismatch. Agent avatar 408 may request a replacement signature. User avatar 410 may provide a replacement signature on the virtual check. Metaverse application 406 may render the replacement signature on the virtual check.

Metaverse application 406 may include hardware interface 414. Hardware interface 414 may interface with customer device 416. Hardware interface 414 may convert customer input at device 416 into metaverse actions controlling user avatar 410. Device 416 as shown is a mobile device, with input provided using a stylus, but any suitable device and any suitable mode of input may be used.

Metaverse application 406 may include hardware interface 418. Hardware interface 418 may interface with check printing device 420. Hardware interface 418 may convert metaverse actions such as a signature by customer avatar 410 on virtual check 412 into a printable check image.

Metaverse application 406 may include user experience module 422. User experience module 422 may determine how the metaverse environment and the interactions between avatars appear to agent 402 and customer 404.

Metaverse application 406 may include view engine/controller 424. View engine/controller 424 may enable agent 402 to control the view of customer 404. Screens or items not related to the customer will not be visible to the customer in the metaverse session.

Metaverse application 406 may include session manager 426. Session manager 426 may maintain the conversation between agent avatar 408 and customer avatar 410 for the duration of the session. Session manager 426 may store audit logs of the session in database 428 for future reference.

Figure 5:
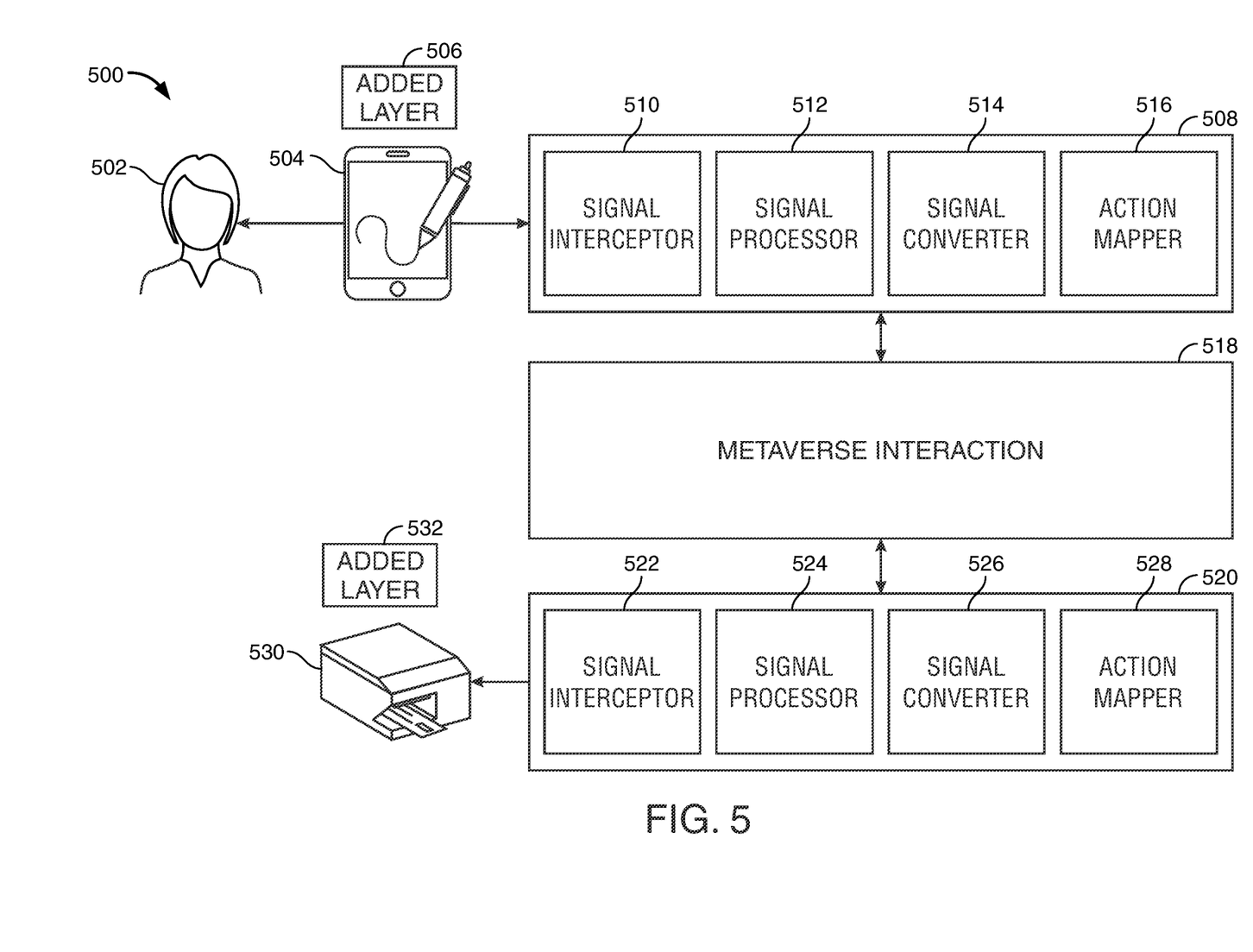
FIG. 5 shows an illustrative process flow in accordance with principles of the disclosure.

FIG. 5 shows process flow 500 illustrating the metaverse application hardware interface. One or more elements of process flow 500 may overlap with elements of process flow 400, shown in FIG. 4.

During a metaverse session, user 502 may provide input at device 504. Device 504 as shown is a mobile device with input provided using a stylus, but any suitable device and any suitable type of input may be used. Added layer on 506 on device 504 may process user inputs. The added layer may be haptic enabled.

Hardware interface 508 may receive and process signals from the device 504. Signal interceptor 510 may receive signals from the device 504. Signal processor 512 may process the signals to understand the user input. Signal converter 514 may convert the input to metaverse instructions. Action mapper 516 may direct avatar actions in the metaverse environment based on the instructions. Hardware interface 508 may correspond to hardware interface 414, shown in FIG. 4.

The metaverse session may include bidirectional interactions 518 between an agent and the device. The agent side may include hardware interface 520. Hardware interface 520 may include signal interceptor 522, signal processor 524, signal converter 526, and action mapper 528. Hardware interface 520 may correspond to hardware interface 418, shown in FIG. 4.

Hardware interface 520 may receive or transmit signals from check printing device 530. Check printing device 530 may include added layer 532 for interactions with the metaverse session. Check printing device 530 may print a signature rendered by an avatar during metaverse interaction 518.

Figure 6:
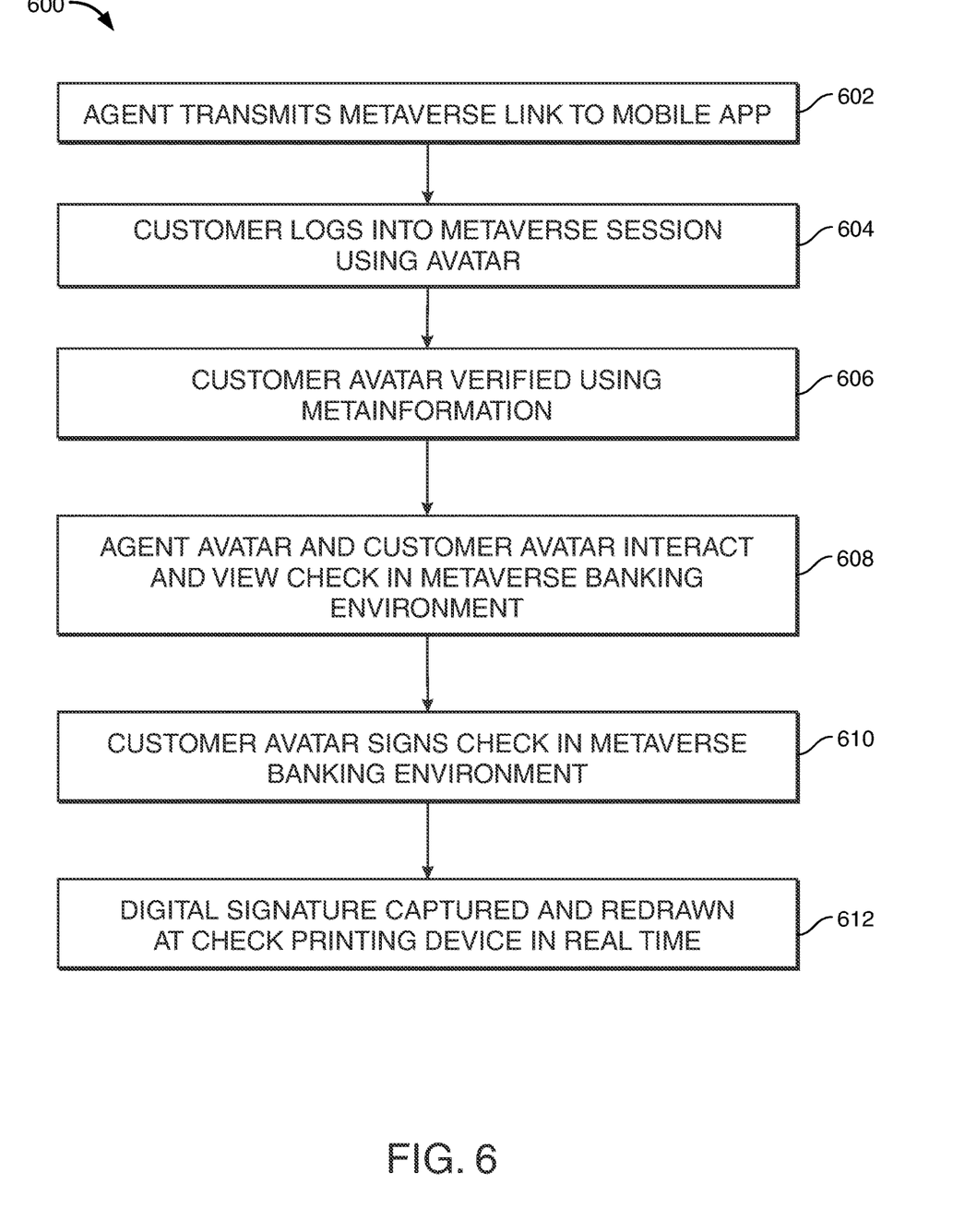
FIG. 6 shows an illustrative process flow in accordance with principles of the disclosure.

FIG. 6 shows process flow 600 for check remediation using metaverse interactions. At step 602, an agent may transmit a metaverse link to a mobile application on a customer device. At step 604, the customer may log into the metaverse session using an avatar. The avatar may be a new avatar, a previously used avatar or an avatar that was previously assigned or previously registered.

At step 606, the customer avatar may be verified using meta-information associated with the avatar. For example, features of avatar appearance may be compared to features that have been stored during previous metaverse sessions. In some embodiments, the avatar may be verified based on user device features or on modes of interaction with the user device.

At step 608, and agent avatar and customer avatar may interact within the metaverse environment. The metaverse environment may include a digital rendering of a defective check. The agent may explain a remediation protocol to the customer. The remediation protocol may include receiving a replacement signature from the customer avatar. The remediation protocol may include receiving other information from the customer avatar such as corrected account information or updated balance information.

In the case of remediation protocol involving a replacement signature, at step 610, the customer avatar may sign the digital check in the metaverse environment. At step 612, the digital signature may be captured and replicated at a check printing device. The check printing device may replace the customer signature in real time.

Thus, methods and apparatus for CHECK EXCEPTION PROCESSING IN THE METAVERSE are provided. Persons skilled in the art will appreciate that the present invention can be practiced by other than the described embodiments, which are presented for purposes of illustration rather than of limitation, and that the present invention is limited only by the claims that follow.

What is claimed is:

1. A system for authenticating avatar activity wherein the activity includes a transaction associated with a paper check that is defective wherein the paper check comprises a first signature, the system comprising:
   a first user device with an associated first avatar;
   a second user device with an associated second avatar;
   a check printing device; and
   a server comprising a processor and a memory storing a metaverse application comprising a session manager module, and computer-executable instructions, that when executed by the processor, cause the processor to perform steps of:
   storing, for a plurality of metaverse sessions, a history of metaverse interactions of the first avatar and the second avatar;
   creating, via the metaverse application, a metaverse session;
   receiving, from the first avatar, and via the first user device, a log-in request to the metaverse session;
   authenticating the first avatar based on the history of metaverse interactions of the first avatar;
   based on the authentication, generating interactions between the first avatar and the second avatar during the metaverse session and recording, via the session manager module, the interactions in the history of metaverse interactions wherein the generating interactions comprises:
   displaying a virtual check representation of the paper check;
   receiving a signature from the first avatar; and updating the virtual check by replacing the first signature with the received signature; and printing, via the check printing device, the updated virtual check.

2. The system of claim 1, wherein the authentication is further based on a feature of the first user device.

3. The system of claim 1, wherein the updated virtual check is associated with a financial institution account that belongs to a user of the first user device.

* * * * *